United States Patent

[11] 3,593,097

| [72] | Inventor | Edward F. Gebelein, Jr.<br>Harveinton, Conn. |
|------|----------|---------------------------------------------|
| [21] | Appl. No. | 836,122 |
| [22] | Filed | June 24, 1969 |
| [45] | Patented | July 13, 1971 |
| [73] | Assignee | Chandler Evans Inc.<br>West Hartford, Conn. |

[54] DIGITAL PROPORTIONAL SERVOSYSTEM
17 Claims, 2 Drawing Figs.

| [52] | U.S. Cl. | 318/696, 318/138, 318/603 |
|------|----------|---------------------------|
| [51] | Int. Cl. | G05b 19/40 |
| [50] | Field of Search | 318/138, 20.860, 20.550, 20.907, 20.320 |

[56] References Cited
UNITED STATES PATENTS

| 3,414,785 | 12/1968 | Orahood et al. | 318/30 X |
| 3,465,217 | 9/1969 | Kress | 318/162 X |
| 3,466,517 | 9/1969 | Leenhouts | 318/138 X |

*Primary Examiner* — Benjamin Dobeck
*Attorney* — Fishman and Van Kirk

ABSTRACT: A proportional, open loop motor control which synthesizes a pulse count proportional to the width of pulse width modulated command signals, the thus synthesized pulse count being compared to the accumulation of previously synthesized counts sent to a step motor or other type of incremental actuator to determine existence and direction of a position error, an indication of error being employed to gate proportional pulses from a low frequency oscillator to said motor to be controlled.

DIGITAL PROPORTIONAL SERVOSYSTEM

BACKGROUND OF THE INVENTION

1. Field of the Invention

The present invention relates to the positioning of movable members. More specifically, the present invention is directed to an open-loop control system which provides control signals proportional to the magnitude of an input command signal. Accordingly, the general objects of the present invention are to provide novel and improved methods and apparatus of such character.

2 Description of the Prior Art

While not limited thereto in its utility, the present invention is particularly well suited to use in open-loop servosystems. An open-loop system may be defined as one wherein the actual position of a mechanism being positioned or the output shaft movements of the controlling motor therefore are not sensed and fed back to the input of an error signal generator. A typical open-loop servosystem may be considered to be an electromechanical fuel control for a gas turbine engine wherein the stem of a fuel metering valve comprises the mechanism to be positioned via a stepping motor. In the environment of a turbine fuel control, devices capable of sensing the position of the valve and/or stepping motor output shaft would necessarily be subjected to extreme temperature variations, would typically be immersed in the fuel and would often be subjected to substantial shock and vibration. As a result of the rather severe and widely varying environmental conditions, attempts at actually sensing valve or motor output shaft position in electromechanical turbine engine fuel controls have generally been unsuccessful and sensor failure has, in turn, impeded the acceptance of fuel control systems incorporating electronic circuitry in spite of the other substantial advantages inherent in such electronic controls.

It is to be noted that, while open-loop motor control systems have been proposed, such systems have typically been lacking in accuracy and speed of response. Rapid response is, of course, desirable in the interest of stability in order to avoid hunting and lagging effects.

Summary of the Invention

The present invention overcomes the above-discussed and other disadvantages of the prior art and in so doing provides a novel and improved motor control system. The system of the present invention employs digital logic and is characterized by rapid response and by obviating the necessity of closing a feedback loop between the mechanism to be controlled and the input to the error signal generator.

In achieving the foregoing, the present invention receives, as the input signal, a pulse width modulated voltage. The input signal is scheduled through a proportional network or logic system wherein a pulse count proportional to input pulse width is synthesized. The thus synthesized pulse count is compared with a previously stored count, which will be commensurate with actual motor output shaft position and, when an error is detected, proportional pulses will be gated from a suitable pulse source to the motor to be controlled.

In accordance with the present invention, a high frequency oscillator, counting circuitry and logic circuitry are interconnected to define a proportional path. A number of pulses commensurate with the input signal pulse width are applied to an error counter. In the error counter the pulses are compared with a totalized and periodically updated count of pulses previously transmitted to the motor. Whenever a difference exists between the pulses commensurate with the input signal and with the most recent total of pulses delivered to the motor, control pulses from a proportional pulse source are gated to a translator which converts such control pulses to an appropriate three-phase signal for application to the motor to be controlled. The present invention also contemplates logic circuitry which calculates and applies to both the translator and the means for totalizing the pulses passed to the motor a signal commensurate with the sign of the motor position error whereby a control signal generated by the present invention will cause motor operation in the appropriate direction to null the error.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figure 1:
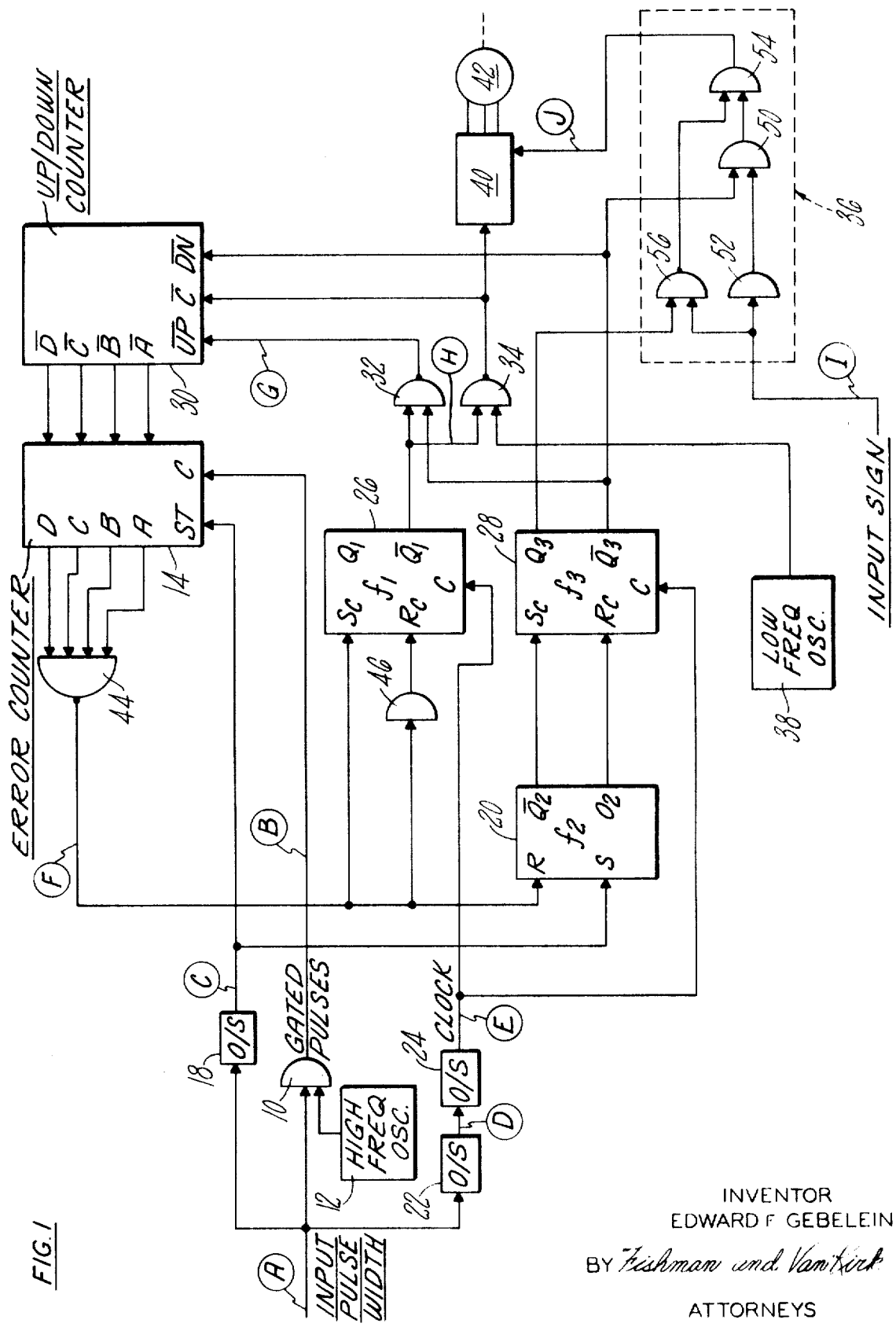
FIG. 1 is a block diagram of a preferred embodiment of the present invention.
Figure 2:
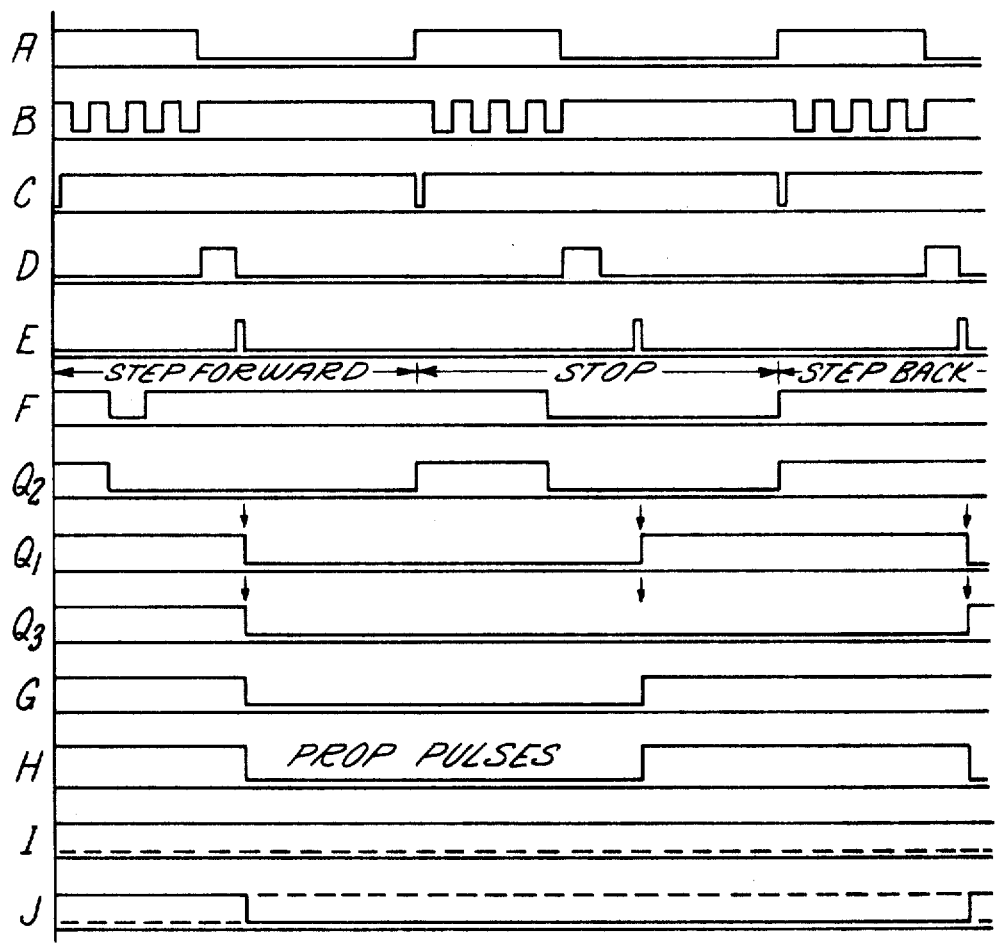
FIG. 2 depicts waveforms which would appear at various points of the circuitry of FIG. 1.

Referring now jointly to FIGS. 1 and 2, input pulses having a width commensurate with an error signal are applied as gating signals to an AND gate 10. Considering the application of the present invention to an electromechanical fuel control for a gas turbine engine, the signals applied at the control input to gate 10 may be commensurate with turbine speed error. The width of the pulses applied to AND gate 10 is indicative of the existence and direction of a speed error which may be corrected by an appropriate adjustment of a fuel flow valve operated by a motor controlled by the present invention.

As previously noted, the pulse width modulated input signals, waveform A of FIG. 2, are applied to the first or control terminal of AND gate 10. Square wave pulses provided by a high frequency oscillator 12 are also applied to gate 10. As may be seen from waveform B of FIG. 2, the number of oscillator pulses passed by gate 10 will be commensurate with the width of the received input pulse. These gated pulses, which may be indicative of an error or, more precisely, a need to reposition the mechanism being controlled by the present invention, are applied to an error counter 14. Error counter 14 may comprise a parallel loading "up counter" such as, for example, a Signetics Corporation model 8281 binary counter with parallel entry.

The input pulses are also applied to a monostable multivibrator 18. Multivibrator 18 provides strobe and synchronization pulses, as shown by waveform C of FIG. 2, which are applied to error counter 14 and also as one input to a one-bit "memory" circuit comprising an RST multivibrator circuit 20. As will be described in greater detail below, multivibrator 18 is set by the leading edge of each input pulse.

The input pulses are also applied to a clock circuit comprising cascade connected one-shot multivibrators 22 and 24. As may be seen from waveforms D and E of FIG. 2, delay multivibrator 22 is set by the trailing edge of each input pulse and, in turn, clock multivibrator 24 will be set by the trailing edge of the pulses provided by multivibrator 22. Accordingly, multivibrator 24 provides delayed clock pulses which are applied to RST multivibrators 26 and 28 for the purposes to be explained below. It is to be noted that RST multivibrators 26 and 28 may be Signetics Type SE–8424 while RST flip-flop 20 may be Signetics Type SE–8824.

Information commensurate with the position of the mechanism to be controlled is stored in an up-down counter 30. Counter 30 may, for example, be a serial entry up-down counter with limited capacity such as Sylvania Electric Products type SM–180. The $\bar{Q}$ output of multivibrator 26 is applied, via a NAND gate 32, to the "up" count input of counter 30. In addition to being connected to a first input of gate 32, the $\bar{Q}$ output of multivibrator 26 is also applied to a first input of NAND gate 34. The $\bar{Q}$ output of multivibrator 28 is connected to the "down" count input of up-down counter 30 and to a logic circuit 36. In addition, the $\bar{Q}$ output of multivibrator 28 is connected to the other input of NAND gate 32.

A low frequency oscillator 38, which generates the proportional pulses to be delivered to the motor to be controlled, is connected to the second input of NAND gate 34. As will be described in detail below, the application of a zero signal to gate 34 from multivibrator 26 will enable gate 34 whereby the proportional pulses from oscillator 38 will be passed. Thus, upon enabling of gate 34, proportional pulses from oscillator 38 will be applied to the "count" input of up-down counter 30 and to a translator 40. Translator 40 is a state of the art device which converts input signals in the form of a pulse train to a three-phase AC signal for application to the motor to be controlled. In the example being described, the motor to be controlled comprises a stepping motor 42 which has its output shaft mechanically coupled to the fuel metering valve which is to be adjusted in order to null the turbine speed error.

It is to be noted that both outputs of RST multivibrator 28 are applied to logic circuit 36 and the output of the logic circuit is also applied to translator 40. As will be described below, logic circuit 36 comprises four NAND gates which either pass or invert an input signal commensurate with the sign of the speed error signal. The input signal commensurate with the sign of the error is provided by circuitry which is well known in the art and which does not comprise a part of the present invention.

The stages of up-down counter 30 are connected, via gating circuitry which forms a part of error counter 14, to corresponding stages of the error counter. All of the stages of error counter 14, only four stages being shown for purposes of illustration, are in turn connected as inputs to a NAND gate 44. Accordingly, the last pulse which fills error counter 14 will cause NAND gate 14 to go to zero, a "one" signal appearing at the output of gate 44 at all other times. The output of gate 44 is directly connected to the set input of RST multivibrator 26 and to the reset input of one-bit memory circuit 20. In addition, the output of gate 44 is also connected, via a further NAND gate 46, to the reset input of multivibrator 26.

The circuitry of the disclosed embodiment of the present invention is completed by the connection of the $Q_2$ and the $\bar{Q}_2$ outputs of circuit 20 respectively to the reset and set inputs of RST multivibrator 28.

Operation of the above-described circuitry will now be explained, the relationship of the waveform diagram of FIG. 2 to FIG. 1 being established by the alphabetical designations of the various signals as indicated in FIG. 2 and applied to FIG. 1.

Input pulses A applied to one-shot multivibrator 18 will cause the generation of strobe and synchronization pulses C by driving the output of multivibrator 18 momentarily to zero. Application of a strobe pulse to the strobe (ST) input of error counter 14 will clear counter 14 and transfer the compliment of the count stored in up-down counter 30 into error counter 14. The leading edge of the input pulse A will also cause the enabling of gate 10 whereby a plurality of pulses B will be delivered from high frequency oscillator 12 to the count (C) input of error counter 14. As may be seen from FIG. 2, the number of pulses B delivered to counter 14 will be commensurate with the width of the input pulse A and these pulses will be delivered to the error counter subsequent to the clearing of the counter by a strobe pulse C.

In error counter 14, the gated pulses B will be added to the complement of a count commensurate with motor 42 output shaft position as transferred from up-down counter 30. As noted above, the last of the gated pulses B which fills error counter 14 will cause the output of NAND gate 44 to go to zero. Accordingly, if the sum of the complement of the previous position signal and the pulses passed by gate 10 fails to fill counter 14, the output of gate 44 will remain at the "one" state whereas overflow of error counter 14 will cause the output of NAND gate 44 to go to zero and thereafter return to its static "one" state. If NAND gate 44 goes to zero, one-bit memory multivibrator 20, which will be set by a synchronization pulse C from multivibrator 18, will be reset. Also, a zero output from NAND gate 44 will cause the setting of RST multivibrator 26. If error counter 14 overflows, NAND gate 46 will function as an inverter and will cause the resetting of multivibrator 26.

In the manner described above, and as may be seen from FIG. 2, a clock pulse E will be generated a short time after the input pulse A terminates. The delay in application of a clock pulse, as established by delay multivibrator circuit 22, is sufficient to permit completion of the operation of error counter 14. The clock pulses will cause the transfer of the information appearing at the inputs of RST multivibrators 26 and 28 to the outputs of these circuits. Restated, through the operation of NAND gates 44 and 46 and memory circuit 20, static information is presented at the set and reset terminals of RST multivibrators 26 and 28 and this static information will be applied to the proper output terminals of the multivibrators upon the generation of a clock pulse by one-shot multivibrator 24.

As previously described, the information appearing at the inputs to RST multivibrators 26 and 28 will be indicative of whether error counter 14 has overflowed, counted up to its capacity or not been filled by the total of the gated pulses B and the compliment of the position information stored in up-down counter 30. Thus, multivibrator 20 "remembers" whether error counter 14 has been filled or overflowed since this circuit will have been reset by a zero signal appearing at the output of Nand gate 44. Restated, the $Q_2$ output of circuit 20 will be zero if counter 14 has counted to its capacity or overflowed whereas a zero signal will appear at the $\bar{Q}_2$ output of circuit 20 if counter 14 has not counted to its capacity. The state of circuit 20 will, upon the generation of a clock pulse, be transferred to the output of circuit 28 whereby the appearance of a zero at the $Q_3$ output of multivibrator 28 will indicate that counter 14 has not been counted to its capacity, this in turn being an indication that the stepping motor 42 should be repositioned in the "up" direction. Similarly, the appearance of a zero at the $\bar{Q}_3$ output of circuit 28 will be indicative of the fact that counter 14 has counted to its capacity or overflowed and the motor 42 should thus be stepped in the "down" direction. Since the $\bar{Q}_3$ output of RST multivibrator 28 is connected to the "down" input of up-down counter 30, the appearance of a zero signal on this output will cause stepping motor pulses applied to counter 30 to be subtracted from the count previously stored therein. The $\bar{Q}_3$ output of circuit 28 is applied to a NAND gate 50 in logic circuit 36 and enables this gate. The enabling of gate 50 will permit passage of input sign information to translator 40 in inverted form indicative of a need to reposition motor 42 in the "down" direction; inversion of the input sign information signal being accomplished by serial application thereof to NAND gates 52, 50 and 54. Gate 56 of logic circuit 36 is enabled by the appearance of a zero at the $Q_3$ output of RST multivibrator 28 and the input sign information will be serially passed through gates 56 and 54 and thus will not be inverted prior to application to translator 40. Accordingly with a zero output at the $Q_3$ output terminal of multivibrator 28, any pulses delivered to motor 42 will cause the motor to step in the "up" direction.

Since only the $\bar{Q}_1$ output of RST multivibrator 26 is employed, it may be seen that a zero signal will be applied to first inputs of NAND gates 32 and 34 only when error counter 14 is full. Accordingly, NAND gate 44 is driven to the zero level thus setting RST multivibrator 26 only when the motor should be stopped. The appearance of a zero signal at the $\bar{Q}_1$ output of circuit 26 will inhibit gates 32 and 34 thus preventing the delivery of proportional pulses from oscillator 38 to translator 40. At all other times, that is when error counter 14 has either not counted to capacity or has overflowed, a "one" signal will appear at the $\bar{Q}_1$ output of multivibrator 26 and gate 34 will enabled. The enabling of gate 34 will, of course, permit the application of proportional pulses to both translator 40 and up-down counter 30. As previously noted, if the $\bar{Q}_3$ output of multivibrator 28 is at zero, the proportional pulses will be subtracted from the count previously stored in counter 30. However, if the $\bar{Q}$ outputs of both of multivibrators 26 and 28 are at one, gate 32 will function as an inverter and will apply a zero to the "up" count input of counter 30 and the proportional pulses will be added to the count previously stored in counter 30.

While preferred embodiments have been shown and described, various modifications and substitutions may be made thereto without departing from the spirit and scope of the present invention. Accordingly, it is to be understood that the present invention has been described by way of illustration and not limitation.

What I claim is:

1. An open loop servocontrol system comprising:
   means for storing a binary signal commensurate with the actual position of a member to be controlled;
   first means responsive to a pulse width modulated input signal for synthesizing pulse counts commensurate with position information contained in said input signal;
   comparator means responsive to said binary signal and said synthesized pulse count for providing output signals indicative of the results of comparisons of said signal and count;
   second means responsive to said input signal for clearing said comparator means in the periods between delivery of successive synthesized pulse counts to said comparator means;
   means responsive to said comparator means output signals for providing gating signals indicative of the existence and direction of a position error;
   means for generating control signals for application to the member to be controlled;
   first gating means responsive to said gating signals and said control signals for passing said control signals to the member to be controlled; and
   means applying control signals passed by said gating means to said storing means whereby said actual position signal is updated.

2. The apparatus of claim 1 wherein said storing means comprises:
   a pulse counter responsive to control pulses passed by said gating means.

3. The apparatus of claim 2 wherein said comparator means comprises:
   an error counter coupled to said pulse counter and having the output of said pulse count synthesizing means applied as an input thereto; and
   means for providing and output signal commensurate with the state of said error counter.

4. The apparatus of claim 3 wherein said means for clearing said comparator further comprises:
   means responsive to said input signals for recording in said error counter the complement of the accumulated count stored in said pulse counter, said error counter thereafter summing said complement and the synthesized pulse count.

5. The apparatus of claim 4 wherein said means for providing an output signal commensurate with the state of said error counter comprises: means providing an output pulse when said error counter has counted to its capacity, said output pulse terminating when said error counter overflows.

6. The apparatus of claim 1 wherein said comparator means comprises:
   means for providing an output signal only when the comparison of said actual and desired position signals is indicative of no need to reposition the member to be controlled.

7. The apparatus of claim 6 wherein said means for providing gating signals comprises:
   first bistable circuit means responsive to the output of said comparator means for providing a first gating signal indicative of the absence of an output signal from said comparator means, said first gating signal being commensurate with a need to reposition the member to be controlled; and
   second bistable circuit means responsive to the output of said comparator means for providing a second gating signal commensurate with a need to reposition the member to be controlled in a first direction.

8. The apparatus of claim 7 wherein said first gating means is responsive to said first gating signal.

9. The apparatus of claim 7 wherein said storing means comprises:
   an up-down pulse counter.

10. The apparatus of claim 9 wherein said means applying said control signals to said up-down counter comprises;
    means applying control pulses passed by said first gating means to the input of said up-down counter;
    second gating means responsive to said first and second gating signals for generating a counter control signal commensurate with a need to reposition in said first direction;
    means applying said counter control signal to a first control input of said up-down counter; and
    means connecting the output of said second bistable circuit to a second control input of said up-down counter, the absence of said second gating signal being indicative of a need to reposition in a second direction.

11. The apparatus of claim 1 further comprising:
    means responsive to said gating signals for generating direction control signals for the member to be controlled.

12. The apparatus of claim 11 wherein said storing means comprises:
    an up-down counter.

13. The apparatus of claim 12 wherein said comparator means comprises:
    an error counter coupled to said up-down counter and having the output of said pulse count synthesizing means applied as an input thereto;
    means responsive to input signals commensurate with the monitored condition for generating a synchronization signal;
    means applying said synchronization signal to an input of said error counter whereby the complement of the count stored in said up-down counter is recorded in said error counter; and
    second gate means connected to said error counter and providing an output pulse only when said error counter has counted to its capacity, said output pulse being indicative of proper positioning of the member to be controlled.

14. The apparatus of claim 13 wherein said gating signal providing means comprises:
    first bistable circuit means connected to said second gate means and responsive to output signals provided thereby, said first bistable circuit providing a first gating signal commensurate with a need to reposition the member to be controlled when said second gate means output pulse is not present;
    second bistable circuit means connected to second gate means and responsive to output signals provided thereby, said second bistable circuit providing second and third gating signals respectively commensurate with a need to reposition the member to be controlled in first and second directions.

15. The apparatus of claim 14 wherein said means for generating direction control signals is responsive to said third gating signals.

16. The apparatus of claim 15 wherein said first gating means is responsive to said first gating signal.

17. The apparatus of claim 16 wherein said means applying said control signals to said up-down counter comprises:
    means applying control pulses passed by said first gating means to the input of said up-down counter;
    third gating means responsive to said first and second gating signals for generating a counter control signal commensurate with a need to reposition in said first direction;
    means applying said counter control signal to a first control input of said up-down counter; and
    means connecting the output of said second bistable circuit to a second control input of said up-down counter, the absence of said second gating signal being indicative of a need to reposition in a second direction.